(12) United States Patent
Roe

(10) Patent No.: US 6,925,337 B2
(45) Date of Patent: Aug. 2, 2005

(54) METHOD AND APPARATUS FOR PROVIDING A DYNAMICALLY PROGRAMMABLE FIELD CONTROLLER

(75) Inventor: William Roe, Manassas, VA (US)

(73) Assignee: Compass Technology, Inc., Exton, PA (US)

( * ) Notice: Subject to any disclaimer, the term of this patent is extended or adjusted under 35 U.S.C. 154(b) by 73 days.

(21) Appl. No.: 10/291,229

(22) Filed: Nov. 8, 2002

(65) Prior Publication Data

US 2003/0199999 A1 Oct. 23, 2003

Related U.S. Application Data

(60) Provisional application No. 60/337,882, filed on Nov. 8, 2001.

(51) Int. Cl.[7] .............................................. G05B 11/01
(52) U.S. Cl. ............................. 700/25; 700/19; 700/87; 717/173; 710/14; 710/62
(58) Field of Search ........................... 700/2, 9, 17–20, 700/23, 25, 83, 87, 28; 717/171–173, 168; 710/8, 14, 62, 65

(56) References Cited

U.S. PATENT DOCUMENTS

| | | | | |
|---|---|---|---|---|
| 4,658,348 A | * | 4/1987 | Flanagan et al. | 700/17 |
| 4,704,676 A | * | 11/1987 | Flanagan et al. | 700/17 |
| 5,469,361 A | * | 11/1995 | Moyne | 700/95 |
| 5,473,531 A | * | 12/1995 | Flora-Holmquist et al. | 700/12 |
| 5,647,231 A | * | 7/1997 | Payne et al. | 68/12.01 |
| 5,786,993 A | * | 7/1998 | Frutiger et al. | 700/83 |
| 5,862,052 A | * | 1/1999 | Nixon et al. | 713/1 |
| 6,337,635 B1 | * | 1/2002 | Ericksen et al. | 340/825.69 |
| 6,493,594 B1 | * | 12/2002 | Kraml | 700/19 |
| 6,633,782 B1 | * | 10/2003 | Schleiss et al. | 700/26 |
| 6,748,476 B2 | * | 6/2004 | Hagino | 710/305 |
| 6,850,973 B1 | * | 2/2005 | Larson et al. | 709/221 |

* cited by examiner

*Primary Examiner*—Anthony Knight
*Assistant Examiner*—Crystal J. Barnes
(74) *Attorney, Agent, or Firm*—Kin-Wah Tong, Esq.; Moser, Patterson & Sheridan, L.L.P.

(57) ABSTRACT

A method and apparatus is disclosed that provides a process whereby the parameters and/or functions of a hardware field device, e.g., field controller, can be altered dynamically by the use of a downloadable data table. This programming method is being called "Full Dynamic Linking" (abbreviated as FDL), and provides a mechanism by which software and firmware is written in such a way as to provide extreme flexibility in the application of control processing.

17 Claims, 3 Drawing Sheets

METHOD AND APPARATUS FOR PROVIDING A DYNAMICALLY PROGRAMMABLE FIELD CONTROLLER

This application claims the benefit of U.S. Provisional Application No. 60/337,882 filed on Nov. 8, 2001, which is herein incorporated by reference.

The present invention relates to an apparatus, system and concomitant method for providing a flexible approach in changing the functions and parameters of a hardware field device, e.g., a field controller. Specifically, the functions and parameters are easily altered via use of a downloadable data table.

BACKGROUND OF THE DISCLOSURE

Automation is widely deployed in numerous systems that are ubiquitous in our society. These systems include but are not limited to door access systems employing card readers, environmental control systems for a building, and numerous sensing systems that are deployed on a manufacturing line of various products. An important aspect of automation is the ability of a system to make predefined decisions and then performed associated actions based upon receiving certain predefined inputs. For example, swiping a proper identification card through a card reader will open a door for a user.

In traditional systems, the automated tasks are typically performed by a local or field hardware device, e.g., a field controller. Namely, inputs are processed locally by a field controller to determine whether an action is to be performed. Such decentralized use of a field controller is inexpensive and easy to deploy.

However, the functions and parameters of such field controller are often implemented via firmware, i.e., permanently burned onto a hardware device. Thus, if the functions and parameters of the field controller are to be changed, the field controller must be removed and replaced or shipped to the manufacturer to be reprogrammed. In practice, the field controller may be updated for only one or a few new functions that are newly applied. Nevertheless, once the field controller is reprogrammed, the manufacturer must again conduct extensive testing on the field controller to verify that it is performing properly as to the new functions plus all the old functions as well. This necessity is based on the fact that the entire firmware must again be loaded onto the field controller. To ensure that the entire firmware is performing properly, the manufacturer must now perform testing on old functions as well as to ensure that the reprogramming did not introduce errors into the old functions. Therefore, the implementation of decentralized field controllers may actually increase cost over time to the users and manufacturers as new functionalities are introduced.

Thus, it would be very desirable to have a system and method that is designed to provide updates to a field controller without having to generate new firmware for the field controller.

SUMMARY OF THE INVENTION

In one embodiment of the present invention, a method and apparatus is disclosed that provides a process whereby the parameters and/or functions of a hardware field device, e.g., field controller, can be altered dynamically by the use of a downloadable data table. This programming method is being called "Full Dynamic Linking" (abbreviated as FDL), and provides a mechanism by which software and firmware is written in such a way as to provide extreme flexibility in the application of control processing.

In one embodiment, the FDL implements a Dynamic Link Table (DLT), a matrix that links cause and effect events. The DLT is not hard-coded in software, but is a dynamic table in which all events generated by all actions from all devices (both hardware and software) are received and compared. The table then cross-references to the actions such an event would take. Applying this methodology in a programming model that utilizes a dynamic table for all events that spans an entire system, coupled with an indexed addressing scheme that addresses every action for every device (hardware and software) provides unique advantages.

For example, every function and every routine can be built and tested independently of all other functions and routines as long as they adhere to the calling conventions set forth in the present invention. This approach allows subtasking the development of both software and firmware, including using outside sources without the need or knowledge of the entire software/firmware development code.

Second, no action is coded to any other action making the entire product extremely flexible and field upgradeable. For example, new functionalities can be provided by simply shipping a new DLT to the client's field controller, without the need to provide new firmware.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention is an apparatus, system and method that are designed to provide a flexible approach in changing the functions and parameters of a hardware field device, e.g., a field controller. Specifically, the present invention provides a mechanism by which software and firmware are written in such a manner as to provide flexibility in the application of control processing.

In brief, the present invention employs a downloadable data table, Dynamic Link Table (DLT), that serves as a matrix that links cause and effect events. The DLT is not hard-coded in software, but is a dynamic table in which all events generated by all actions from all devices (both hardware and software) are received and compared. The table then cross-references to the actions such an event would take. Applying this methodology in a programming model that utilizes a dynamic table for all events that spans an entire system, coupled with an indexed addressing scheme that addresses every action for every device (hardware and software) provides unique advantages.

The present invention is now described below in the context of access control. However, it should be noted that the present invention is not so limited and can be adapted to various automated processes or systems.

Figure 1:
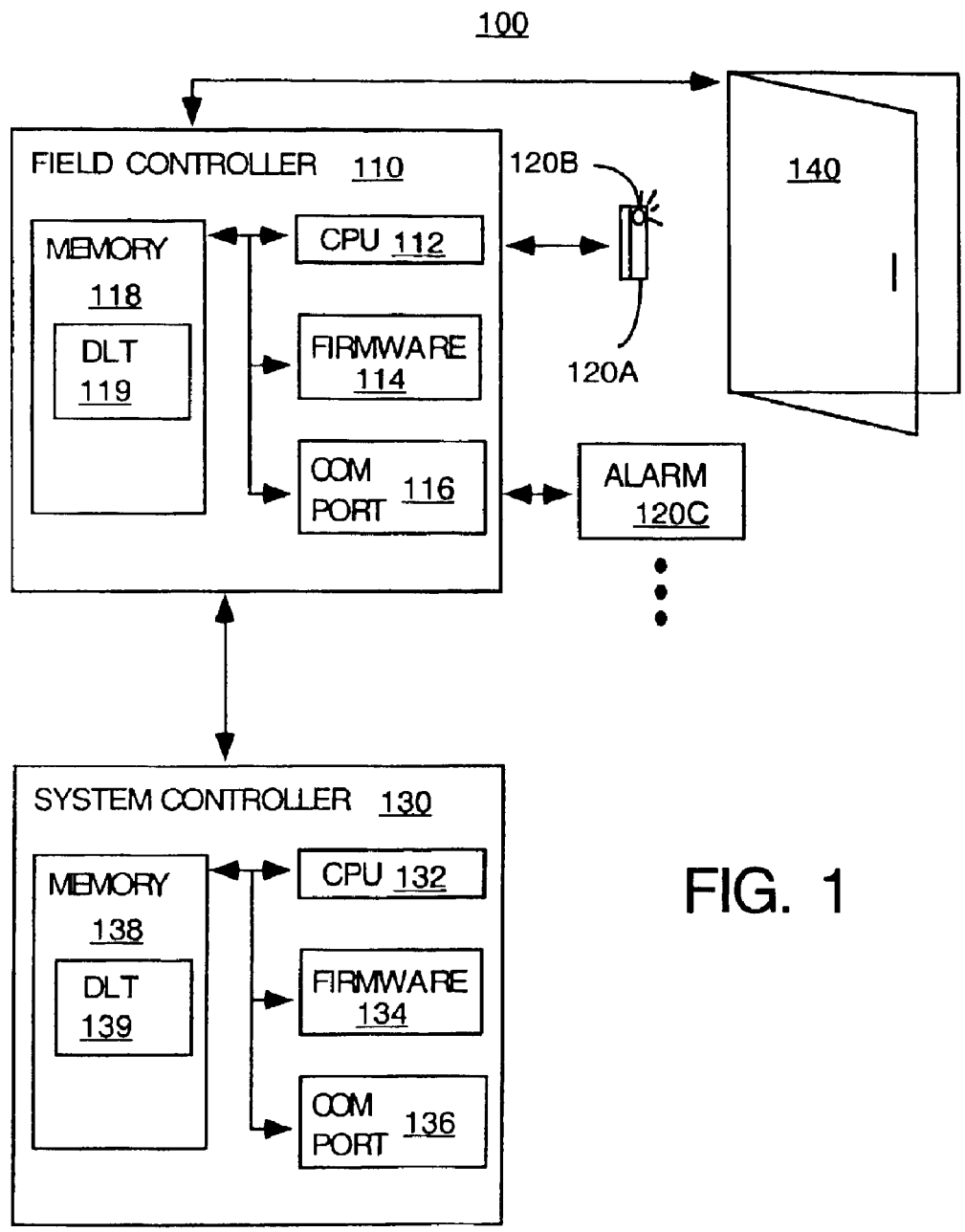
FIG. 1 depicts a block diagram of an overview of the present system and method for providing a flexible approach in changing the functions and parameters of a field controller.

FIG. 1 depicts a block diagram of an overview of the present system 100 for providing a flexible approach in changing the functions and parameters of a field controller.

The system 100 comprises a field controller 110, one or more input/output devices 120, a system controller 130 and one or more devices 140 to be controlled by the field controller 110. In an exemplary embodiment, input/output devices include a card reader 120A, a visible indicator 120B, e.g., an LED, and an alarm unit 120C.

In operation, one of the input/output devices 120 receives an input that is forwarded to the field controller 110. The input could be a user swiping a card into the card reader 120A in an attempt to gain entry through the door 140.

The input is received for processing by the field controller 110. In one embodiment, the field controller 110 comprises a CPU or processor 112, firmware 114 stored on a readable device, e.g., ROM, a communication port 116 and a memory or storage device 118. Within the memory 118, a dynamic link table is stored. The received input is processed by the CPU using the DLT 119 and the firmware 114. As such, the DLT and firmware (including associated methods and data structures) of the present invention can be stored on a computer readable medium, e.g., RAM memory, magnetic or optical drive or diskette and the like. However, unlike conventional field controller, if a function or parameter is modified for the field controller 110, the present invention is capable of implementing the function via a simple replacement of the DLT remotely (or locally) via communication with a system controller 130.

Specifically, system controller 130 is implemented using a general purpose computer. System controller 130 comprises a CPU or processor 132, firmware 134 stored on a readable device, e.g., ROM, a communication port 136, a memory or storage device 138, and a DLT 139. System controller 130 may include various I/O devices (not shown) such as a display, a keyboard, a mouse, a modem, storage devices such as disk drives and the like.

In operation, changes to the functionalities can be changed via the system controller 130. For example, the system controller 130 can be part of a larger facility management system that monitors and controls fire alarms, security alarms, access control, environmental control for an entire building. In such implementation, there may be a need to alter the functionalities of various field controllers to address different conditions.

For example, it may be necessary to provide double doors at various entries to the building. In implementing this modification, the field controllers will also need to be updated to provide control function of the second door. Using the present invention, the updates to the field controller can be implemented via a download of an updated DLT to all the relevant field controllers, thereby greatly reducing the cost and complexity of implementing new functions or conditions. A detailed disclosure of the use of the DLT is provided in FIG. 3.

Figure 3:
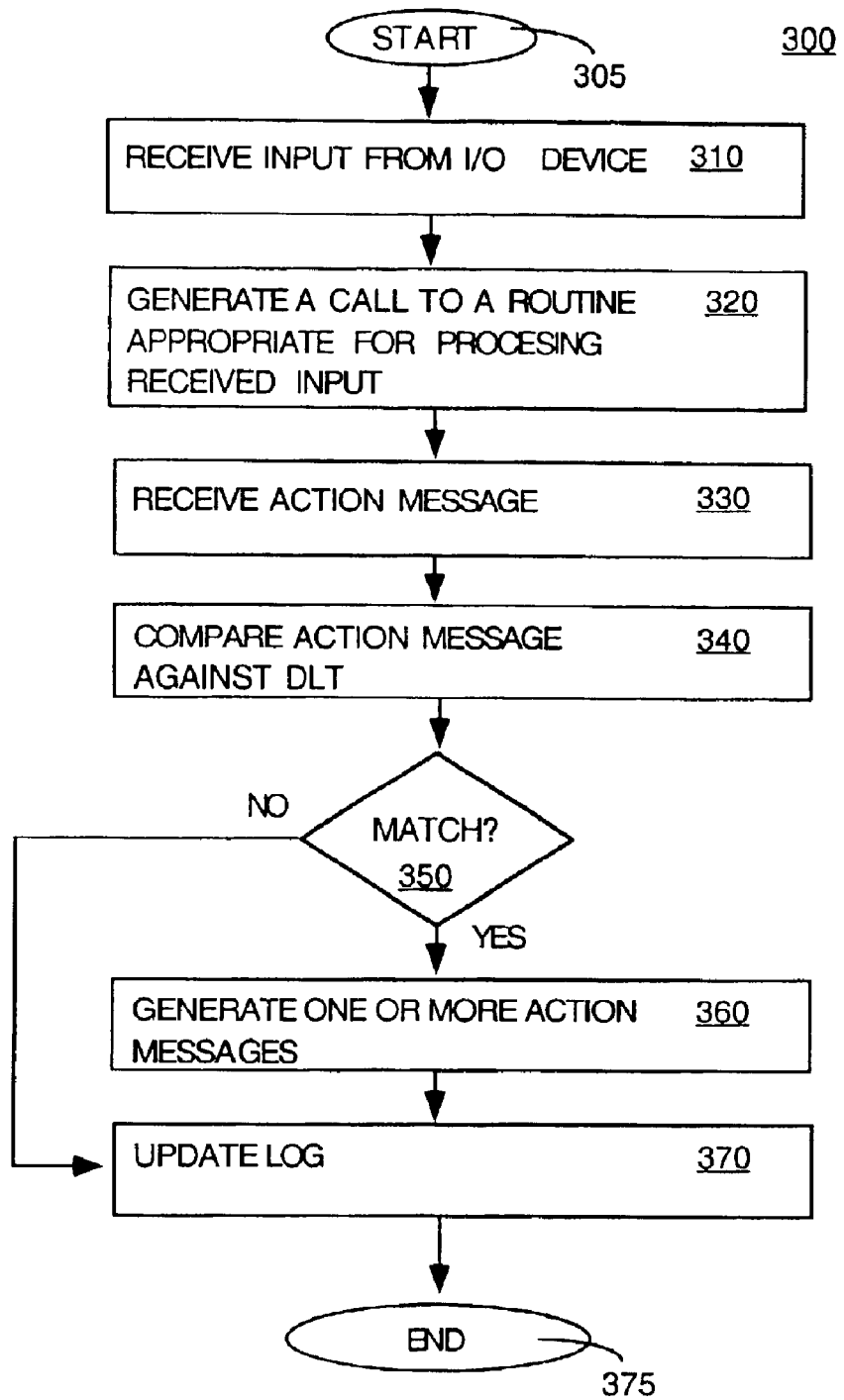
FIG. 3 depicts a block diagram of a flowchart of the method of the present invention for providing a flexible approach in changing the functions and parameters of a field controller.

FIG. 3 depicts a block diagram of a flowchart of the method 300 of the present invention for providing a flexible approach in changing the functions and parameters of a field controller. Again, method 300 is described below in the context of access control, but it should be noted that the present invention is not so limited and can be adapted to various automated processes or systems.

Method 300 starts in steps 305 and proceeds to step 310. In step 310, method 300 receives input from an I/O device. For example, a cardholder swipes his ID Card at a card reader 120A. The received input can be used to generate an action message that is compared against the DLT.

In step 320, a (dynamic) entry in the DLT will generate a call to an appropriate routine for processing the received input, e.g., a "Validate card swipe" routine is called through an action message. The "Validate card swipe" routine evaluates the card ID and generates a "Valid Cardswipe" action message for the given reader.

In step 330, the "Valid Cardswipe" action message is received and compared against the DLT in step 340. In step 350, method 300 queries whether a match is made. Namely, method 300 is determining whether any actions match the "Valid Cardswipe" action message. If the query is negative, then method 300 proceeds to step 370, where the event is logged. If the query is positive, then method 300 proceeds to step 360 where one or more action messages are generated. For example, a first (dynamic) entry in the DLT may generate a call to the "Unlock Door" routine through an action message. The "Unlock Door" routine performs the unlock door function and generates an action message for "Door Unlocked". A second (dynamic) entry in the DLT may generate a "Valid Entry" action message. The "Valid Entry" routine performs the lighting of a green LED 120B. A third (dynamic) entry in the DLT may generate a "Alarm Off" action message. The "Alarm Off" causes the alarm 120C not to go off.

Once again, once all the actions are performed, method 300 logs the actions performed in step 370. Method 300 then ends in step 375.

Figure 2:
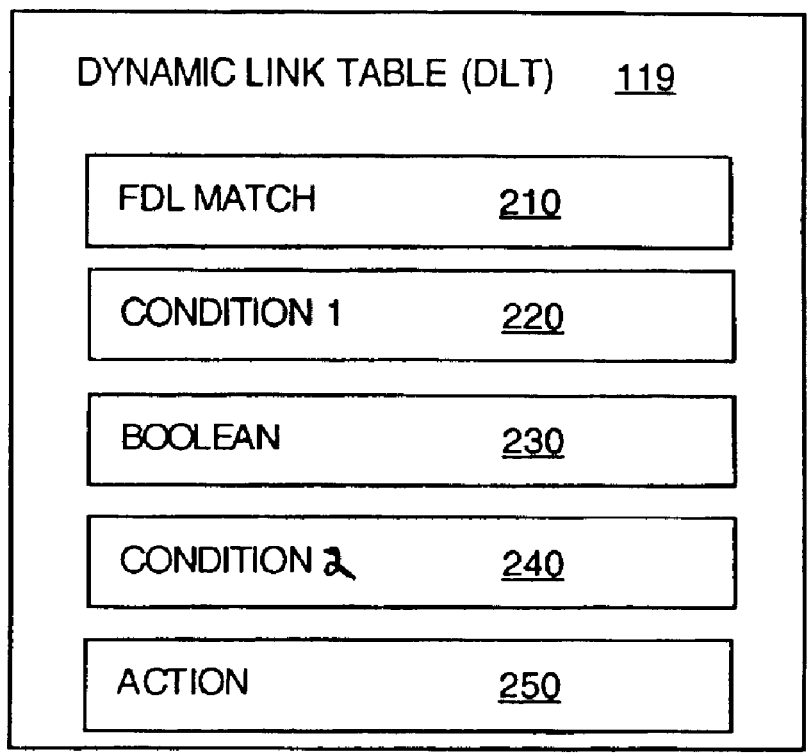
FIG. 2 depicts a block diagram of the data structure of a dynamic link table of the present invention.

FIG. 2 depicts a block diagram of the general data structure 119 of a dynamic link table of the present invention. Specifically, the dynamic link table comprises an FDL Match component 210, a condition 1 component 220, a Boolean component 230, a condition 2 component 240 and an action component 250. It should be noted that the dynamic link table can be modified to contain more or less components in accordance with a particular implementation.

The DLT is now described, in one exemplary embodiment, where it consists of a number of thirteen (13) byte records. Each record contains information that allow the FDL firmware to make logical decisions based on the input received, and alter the functionality of the hardware, based on the results of the evaluation.

In one embodiment, the DLT is illustrated as:

```
part 1 is FDL match data set of 3 bytes
    D1            N1            C1
part 2 is the first condition or data fields
    D2            N2            C2
part 3 is the Boolean test if part 2 or 4 have conditions
    B
part 4 is the second condition or data fields
    D3            N3            C3
part 5 is the action definition if every thing above is OK
    D4            N4            C4
```

The first three bytes comprise the FDL Match component 210. Specifically, the present system stores "FDL entries" into a FDL table, where each FDL entry is a 3-byte expression that reflects a causative action. Namely, the FDL table is the "action" table for all events that occur in a Field Controller (FC). When any event occurs (Card read, Timecode change, etc.), it is placed in the FDL table. The FC software constantly looks for events in the FDL table and when one is found, the DLT is checked for a corresponding entry in the FDL MATCH section. If a FDL match is found (and the conditions match), the ACTION section of the DLT is then performed.

The FDL entry consists of a device definition, a device ID (number), and a cause or action (number) as follows:

| BYTE1 (D) | BYTE2 (N) | BYTE3 (C) |
|---|---|---|
| DEVICE | NMBR (ID) | COND (Cause) |

DEVICE: The Device Type (Reader, Input, etc.)
NMBR: The Device Number (1, 2, etc.)
COND: The Device Condition (Enabled, Set, etc.)

The device can be physical (input, card read, etc.) or a firmware device (timer start, timer timeout, counter value, etc.) or a pseudo device (door open command, custom command 3, etc.) built into the DLT. Device IDs are the identifying number of the unique device, whereas Actions/Causes include SET, RESET, PULSE, INCREMENT, DECREMENT, CHANGE0, CHANGE1, ENABLE, DISABLE, BUSY, etc.

In operation, the FDL entry (D, N, C) is compared to the first 3 bytes (D1, N1, C1) of a 13 byte per entry table, the DLT (Dynamic Linking Table). The comparison is made for a match. If a match is found, then the remaining parts of the DLT are analyzed and any stated action is performed. It should be noted that the letters "D", "N", and "C" generally denote device, device ID number and Cause or condition. Since these three parameters are compared in different operations, Dx, Nx, and Cx, are used to denote a different parameter set as discussed below.

Once a FDL to DLT match is found, conditional checks can be performed against condition1, 220, if required. In one embodiment, condition1 comprises three bytes of data fields (D2, N2 and C2). These checks allow for a complicated set of conditions to occur prior to an action being performed. The checks can be made against the state of a device as in—(INPUT 2 open—TRUE/FALSE) or against a value as in—(COUNTER 4 GT 12).

If a more complicated check is required, a Boolean test or component 230 and a second condition 2 component 240 can be searched. In one embodiment, the Boolean component comprises a single byte (B) and condition 2 comprises three bytes of data fields (D3, N3 and C3).

To illustrate, if a valid device type is in Condition1, the Boolean expression is used to evaluate the device condition, or compare against Condition2. If Condition1-Device is zero (0), then the entire evaluation process is ignored and the action is performed. If Condition2 contains a valid device type, then the condition of the device is evaluated. If Condition2-Device contains a zero (0), then Condition2 evaluation is ignored.

If no checks are to be performed, "XX" is the Boolean entry. This allows for data to be specified in C3, N3, C2, and N2. If the data is an integer, the N3-C3 and N2-C2 pairs can be used. These "integers" are actually 2 bytes in MSB/LSB sequence. The conversion to LSB/MSB is performed in the device.

Finally, the DLT also carries an ACTION component that consists of three (3) parts (D4, N4, and C4). The Action section is performed whenever the Conditions are evaluated to be true based on the Boolean expression (or when no Conditions are specified). The Action can use parameter values that are passed in the Condition1 and Condition2 sections when the Device portions of Condition1 and/or Condition2 is zero (0).

Parameters can be passed to the parameters of the ACTION component of the DLT. The following parameters and their order in the DLT are listed below (C1=Condition1 C2=Condition2):

| | | |
|---|---|---|
| Action(Byte) | → | (C2-Cond) |
| Action(Byte, Byte) | → | (C2-Cond, C2-Nmbr) |
| Action(Ushort) | → | (C2-Nmbr[MSB] C2-Cond[LSB]) |

If Additional parameters are needed, C1 can be used with the above typing convention.

If an FDL match has occurred, then the Boolean operations must be evaluated. The present invention provides a set of illustrative Boolean operations below, but the present invention is not so limited. Namely, the present invention can be practiced with other Boolean evaluators.

In the following set, A and B represent either the evaluated conditions of devices D2 and D3 or the values of C2 or C3.

| | | |
|---|---|---|
| FALSE | A = FALSE | D2 N2 C2 is FALSE |
| TRUE | A = TRUE | D2 N2 C2 is TRUE |
| AND | A = TRUE AND B = TRUE | D2 N2 C2 AND D3 N3 C3 are TRUE |
| NAND | A = FALSE AND B = FALSE | D2 N2 C2 AND D3 N3 C3 are FALSE |
| OR | A = TRUE OR B = TRUE Or both | D2 N2 C2 or D3 N3 C3 is TRUE or both |
| NOR | A = FALSE OR B = FALSE | D2 N2 C2 or D3 N3 C3 is FALSE or both |
| XOR | A = FALSE OR B = FALSE | D2 N2 C2 is TRUE and D3 N3 C3 is FALSE OR D2 N2 C2 is FALSE and D3 N3 C3 is TRUE |
| EQ | A NOT EQUAL TO B | D2 N2 C2 is NOT EQUAL to D3 N3 C3 |
| NE | A = B | the evaluation of D2 N2 C2 =D3 N3 C3 |
| GT | A > B | the evaluation of D2 N2 C2>D3 N3 C3 |
| GE | A >= B | the evaluation of D2 N2 C2>=D3 N3C3 |
| LT | A < B | the evaluation of D2 N2 C2<D3 N3C3 |
| LE | A <= B | the evaluation of D2 N2 C2<=D3 N3C3 |

Additional explanation is provided for the four (4) following evaluators.

XX: This value is used if no comparisons are to be made. It can be used when data is required for an action.

Example:
X X X|0 0 22|XX|0 0 2|TIMER 1 SET
i.e.; set timer 1: repeats=22
time 1=2 units
use for NO comparisons
use for timer: start/set
use for counter: set/inc_by/dec_by ADD: If an input in condition 3 is to be used, this will add the value of condition 2 to it.

Example:

X X X|COUNTER 2 COUNT|ADD|0 0 23|COUNTER 3 SET i.e.; set counter 3=23+the count in counter 2 use only for counter: set/inc_by/dec_by

SUB: If an input in condition 3 is to be used, this will subtract the value of condition 2 from it.

Example:

X X X|0 0 23|SUB|COUNTER 2 COUNT|COUNTER 3 SET i.e.; set counter 3=23−counter 2

(because there is no D2, the C2 value is used)

use only for counter: set/inc_by/dec_by

USE: If an input in condition 2 or 3 is to be used, this will substitute the value of device condition 2 or 3 for the number.

Example:

X X X|0 0 DN_T_SECOND|USE|COUNTER 3 COUNT|TIMER 4 START i.e.; set timer 4: time=counter 3 count and type=countdown seconds

X X X|0 0 0|USE|COUNTER 3 COUNT|COUNTER 4 SET i.e.; set counter 4: time=counter 3 count use for timer: start/set use for counter: set/inc_by/dec_by Several examples of DLT actions, events, and queries by device type are provided below. It should be noted that these examples are provided to illustrate the present invention, and should not be interpreted to limit the present invention in terms of syntax or format.

The ACTION can affect any of the devices the controller supports, including firmware devices such as counters or timers and pseudo devices such as time codes and custom commands. Some actions require parameters. These are identified below for the physical and firmware devices.

The EVENT is an FDL entry caused by a state change of a device or by a message from the controlling authority, e.g., from the firmware or a system controller. The QUERY is a question about the state of a device.

Sample of DLT entry:

| TIMER 3 START (FDL EVENT) | 0 0 0 \|(QUERY 1 or value) | \|XX \|(BOOL) | \|0 0 0 \|(QUERY 2 or value) | \|INPUT 4 SHUNT \|(ACTION) |
|---|---|---|---|---|

INPUT DEVICE EVENT

| | |
|---|---|
| ENABLE | point has been enabled |
| DISABLE | point has been disabled |
| SHUNT | point has been shunted (no need to report) |
| REPORT | point has been set to report |
| HELD | point is in ALARM after a timeout, i.e., holding for a specified time period without reporting the alarm event. |

| Alarm Type | NC4 | NC3 | NC2 | NO4 | NO3 | NO2 |
|---|---|---|---|---|---|---|
| Switch closed | Tamper | Tamper | Clear | Tamper | Alarm | Alarm |
| Switch open | Clear | Clear | Alarm | Alarm | Alarm | Alarm |
| Circuit open | Alarm | Alarm | Alarm | Clear | Clear | Clear |
| Circuit short | Trouble | Alarm | Alarm | Trouble | Trouble | Clear |

It should be noted that "NC4" means normally closed four states alarm and "NO4" means normally open four states alarm and so on, where Tamper is representative of a "short condition", Clear is representative of a normal condition, Alarm is representative of an alarm condition, and Trouble is representative of a open or cut condition.

Sample of DLT entry:

INPUT 1 ALARM|0 0 0|XX|0 0 0|OUTPUT 4 ON

This sample DLT entry indicates the event of "Input 1 Alarm" with no conditions and/or comparison with the Action to be Output 4 being turned on. It should be noted that Input 1 Alarm and Output 4 On are application specific.

QUERY

| | |
|---|---|
| ENABLE | has point been enabled |
| DISABLE | has point been disabled |
| SHUNT | has point been shunted |
| REPORT | has point been reporting enabled |

| Alarm Type | NC4 | NC3 | NC2 | NO4 | NO3 | NO2 |
|---|---|---|---|---|---|---|
| Switch closed | Tamper | Tamper | Clear | Tamper | Alarm | Alarm |
| Switch open | Clear | Clear | Alarm | Alarm | Alarm | Alarm |
| Circuit open | Alarm | Alarm | Alarm | Clear | Clear | Clear |
| Circuit short | Trouble | Alarm | Alarm | Trouble | Trouble | Clear |

Samples of DLT entries:

TIMER 3 START|INPUT 1 ALARM|TRUE|0 0 0|OUTPUT 4 ON

TIMER 3 START|INPUT 1 SHUNT|FALSE|0 0 0|OUTPUT 4 ON

These samples DLT entry indicate the queries of "Is Input 1 Alarm true" with no conditions and/or comparison with the Action to be Output 4 being turned on and "Is Input 1 Shunt false" with no conditions and/or comparison with the Action to be Output 4 being turned on.

ACTION

| | |
|---|---|
| ENABLE | enable |
| DISABLE | disable |
| SHUNT | do not report to PC or system controller |
| REPORT | do report to PC or system controller |

Sample of DLT entry:

TIMER 3 START|0 0 0|XX|0 0 0|INPUT 4 SHUNT

This sample DLT entry indicates the event of Timer 3 starting with no conditions and/or comparison with the Action to be Input 4 being shunt.

Output Device

| EVENT | |
|---|---|
| ENABLE | output has been enabled |
| DISABLE | output has been disabled |
| ON | output relay energized |
| OFF | output relay de-energized |

Sample of DLT entry:
OUTPUT 3 ON|0 0 0|XX|0 0 0|COUNTER 1 INC

| QUERY | |
|---|---|
| ENABLE | has output been enabled |
| DISABLE | has output been disabled |
| ON | is relay energized |
| OFF | is relay de-energized |

Sample of DLT entry:
INPUT 3 CLEAR|OUTPUT 1 ON|TRUE|0 0 0|OUTPUT 1 OFF

| ACTION | |
|---|---|
| ENABLE | enable output |
| DISABLE | disable output |
| ON | energize output relay |
| OFF | de-energize output relay |

Sample of DLT entry:
INPUT 1 ALARM|0 0 0|XX|0 0 0|OUTPUT 4 ON

Thus, the above disclosure provides illustrative definitions for generic input and output devices as to types of events, types of queries and types of actions that can be defined in a DLT entry. To illustrate the present invention, the disclosure below will provide examples pertaining to specific input/out devices and various types of real-life examples.

Reader Device

| EVENT | |
|---|---|
| ENABLE | reader has been enabled |
| DISABLE | reader has been disabled |
| RLOCK | reader has been locked |
| RUNLOCK | reader has been unlocked |
| V_READ | reader has a valid read |
| I_READ | reader has an invalid read |

Sample of DLT entry:
V READ 1 READER|0 0 0|XX|0 0 0|OUTPUT 1 ON

| QUERY | |
|---|---|
| ENABLE | is reader enabled |
| DISABLE | is reader disabled |
| RLOCK | is reader locked |
| RUNLOCK | is reader unlocked |

Sample of DLT entry:
INPUT1 ALARM|READER 1 RUNLOCK|TRUE|0 0 0|OUTPUT 2 ON

| ACTION | |
|---|---|
| ENABLE | enable reader |
| DISABLE | disable reader |
| RLOCK | lock reader (its door) |
| RUNLOCK | unlock reader |

Mode
    CARD CandP CandC PIN PandC CorP CandPandC CorPandC
APB_SET
    APB_H_IN APB_H_OUT APB_S_IN APB_S_OUT APB_T_IN APB_T_OUT

| | | |
|---|---|---|
| | RED_LED | ON OFF |
| | GREEN_LED | ON OFF |
| | BEEPER | ON OFF |

Sample of DLT entry:
INPUT 1 ALARM|0 0 0|XX|0 0 0|READER 1 RUNLOCK

Timer Device

| EVENT | |
|---|---|
| START | timer started |
| STOP | timer stopped |
| PAUSE | timer paused |
| CONTINUE | timer continued |
| CHANGE0 | timer change0 time set in SET action |
| CHANGE1 | timer change1 time set in start action |
| TIMEOUT | timer timed out |

Samples of DLT entries:
TIMER 3 TIMEOUT|0 0 0|XX|0 0 0|OUTPUT 1 OFF
TIMER 2 CHANGE0|0 0 0|XX|0 0 0|OUTPUT 2 OFF
TIMER 2 CHANGE1|0 0 0|XX|0 0 0|OUTPUT 2 ON

| QUERY | |
|---|---|
| ACTIVE | is timer active |
| PAUSE | is timer paused |
| INACTIVE | is timer inactive |
| COUNT | is timer time count =,<,>,etc a value |

Samples of DLT entries:
INPUT 1 ALARM|TIMER 2 INACTIVE|XX|0 0 0|OUTPUT 1 ON
INPUT 1 ALARM|TIMER 7 COUNT|GE|0 0 200|OUTPUT 4 OFF

| ACTION | |
|---|---|
| START | start timer (type and time) |
| STOP | stop timer |
| PAUSE | pause timer |

-continued

| | |
|---|---|
| CONTINUE | continue a paused timer |
| SET | set a repeating timer (off time and # repeats ) |

Samples of DLT entries:
count down 5 seconds
   READER1 V_READ|0 0 DN_T_SECOND|XX|005|TIMER 5 START
set up for onoff timer 30 repeats 15 seconds in state 1
   READER1 V_READ|0 0 30|XX|0 0 15|TIMER 5 SET
start counter 5 seconde in state 0
   READER1 V_READ|0 0 DN_T_SECOND|XX|005|TIMER 5 START DOORTIMER1 or DOORTIMER2 DEVICE This is one way to start a timer based on the sum of the time in C3 and the add_time of the card read on reader 1 or 2. The timer number can be any number selected for the DLT, and once started, works like any normal timer. This can be used to start the door timer, the shunt timer, etc.

Action
   START start timer (type and time) add card extension time
   Sample of DLT entry:
   V_READ1 READER|00 DN_T_SECOND|XX|0 05|DOORTIMER1 START Counter Device

| EVENT | |
|---|---|
| INCREMENT | counter was incremented |
| DECREMENT | counter was incremented |
| THRESHOLD | count is equal to threshold |

Sample of DLT entry:
   COUNTER 1 THRESHOLD|0 0 0|XX|0 0 0|OUTPUT 3 OFF

| QUERY | |
|---|---|
| COUNT | compare counter value to - |
| THRESHOLD | compare counter value to - |

Samples of DLT entries:
   INPUT 1 ALARM|COUNTER 4 COUNT|GE|0 0 10|OUTPUT 3 OFF
   INPUT 1 ALARM|COUNTER 4 COUNT|GE|COUNTER 3 COUNT|OUTPUT 3 ON

| ACTION | |
|---|---|
| SET | set counter to a value |
| INCREMENT | inc counter by 1 |
| DECREMENT | dec counter by 1 |
| INC_BY | inc counter by input value |
| DEC_BY | dec counter by input value |
| THRESHOLD | set counter threshold to value |

Samples of DLT entries:
   V_READ 1 READER|0 0 0|XX|0 0 0|COUNTER 3 INCREMENT
   V_READ 1 READER|0 0 0|XX|0 0 10|COUNTER 3 INC BY
   V_READ 1 READER|0 0 0|XX|0 0 20|COUNTER 3 THRESHOLD Timecode Device
Event
   V_TC timecode N changed to T/F
Samples of DLT entries:
   V_TC 23 TRUE|0 0 0|XX|0 0 10|READER 2 RUN-LOCK
   V_TC 23 TRUE|COUNTER 4 COUNT|GE|0 0 10|OUTPUT 3 OFF
Query
   V_TC is timecode N T/F
Sample of DLT entry:
   INPUT 1 ALARM|V_TC 7 FALSE|XX|0 0 0|OUTPUT 3 OFF Group Device

| QUERY | |
|---|---|
| INPUT | is input group = N |
| OUTPUT | is output group = N |
| READER | is reader group = N |

Sample of DLT entry:
   V_TC 23 TRUE|OUTPUT 4 GROUP|EQ|0 0 10|OUTPUT 4 OFF

EXAMPLES OF DLT EVENTS (PSEUDO DEVICES)

In addition to the above devices, the action of a valid DLT match can be a new FDL entry. This allows for a number of conditions to trigger the same action, or one condition complicated condition to trigger many actions. The use of "custom" FDL and DLT entries provide this capability. These currently include CUSTOM, DOOR_CTRL, and OUTPUT_CTRL. This principle will be expanded as required to handle other "standard events".

As an example—
The possible triggering events:

| E1 | REX pushed | input switch opened FDL |
|---|---|---|
| E2 | Valid card read | valid card read FDL |
| E3 | Command from host | FDL sent from host to unlock door |

The resultant actions to be taken:

| R1-1 | Start timer m | start timer for alarm shunt |
|---|---|---|
| R1-2 | Start timer n | start timer for door open |
| R1-3 | Start timer o | start timer for reader acknowledgement beep |

Without using the DOOR_CTRL pseudo device the DLT would require separate entries each of which would require the same resultant actions to be taken.

| | |
|---|---|
| if E1 | then R1-1 |
| if E1 | then R1-2 |
| if E1 | then R1-3 |
| if E2 | then R1-1 |
| if E2 | then R1-2 |
| if E1 | then R1-3 |
| if E3 | then R1-1 |
| if E3 | then R1-2 |
| if E1 | then R1-3 |

By using the DOOR_CTRL pseudo device the DLT would require only one FDL message to trigger the integrated set of actions desired. And, that one message could be started by anyone of several causes.

| | |
|---|---|
| if E1 | then DOOR_CTRL1 |
| if E2 | then DOOR_CTRL1 |
| if E3 | then DOOR_CTRL1 |
| if DOOR_CTRL1 | then R1-1 |
| if DOOR_CTRL1 | then R1-2 |
| if DOOR_CTRL1 | then R1-3 |

Real Life Example #1

The requirement is that if a 4 state N.C. input switch opens, then it triggers an output (to sound alarm). The output resets when the input switch is closed.

The events are—

| | |
|---|---|
| E1 | the switch opens ALARM |
| E2 | the switch closes CLEAR |

The results are—

| | |
|---|---|
| R1 | output on |
| R2 | output off |

Assuming the use of input 2 and output 4 the following DLT entries are required.

| | | | | | | | | | | | | |
|---|---|---|---|---|---|---|---|---|---|---|---|---|
| DLT line or entry 1 | 31 | 2 | 56 | 0 | 0 | 0 | XX | 0 | 0 | 0 | 41 | 4 | 32 |
| DLT line or entry 2 | 31 | 2 | 57 | 0 | 0 | 0 | XX | 0 | 0 | 0 | 41 | 4 | 33 |
| Line 1 | | | | | | | | | | | | | |
| D1 = 31 | | | | | input | | | | | | | | |
| N1 = 2 | | | | | 2 | | | | | | | | |
| C1 = 56 | | | | | alarm | | | | | | | | |
| D2 = 0 | | | | | | | | | | | | | |
| N2 = 0 | | | | | | | | | | | | | |
| C2 = 0 | | | | | | | | | | | | | |
| B = 99 | | | | | XX = continue | | | | | | | | |
| D3 = 0 | | | | | | | | | | | | | |
| N3 = 0 | | | | | | | | | | | | | |
| C3 = 0 | | | | | | | | | | | | | |
| D4 = 41 | | | | | output | | | | | | | | |
| N4 = 4 | | | | | 4 | | | | | | | | |
| C4 = 32 | | | | | on | | | | | | | | |
| Line 2 | | | | | | | | | | | | | |
| D1 = 31 | | | | | input | | | | | | | | |
| N1 = 2 | | | | | 2 | | | | | | | | |
| C1 = 57 | | | | | clear | | | | | | | | |
| D2 = 0 | | | | | | | | | | | | | |
| N2 = 0 | | | | | | | | | | | | | |
| C2 = 0 | | | | | | | | | | | | | |
| B = 99 | | | | | XX = continue | | | | | | | | |
| D3 = 0 | | | | | | | | | | | | | |
| N3 = 0 | | | | | | | | | | | | | |
| C3 = 0 | | | | | | | | | | | | | |
| D4 = 41 | | | | | output | | | | | | | | |
| N4 = 4 | | | | | 4 | | | | | | | | |
| C4 = 33 | | | | | off | | | | | | | | |

It should be noted various numbers in the examples are arbitrarily set.

Real Life Example #2

The requirement is that if a 4 state N.C. input switch opens then it triggers an output (to sound alarm). The output resets after 3 minutes regardless of the state of the input switch.

The events are—

E1 the switch opens

The results are—

| | |
|---|---|
| R1 | start timer 5 |
| R2 | output on |
| R3 | timeout timer 5 |
| R4 | output off |

Assuming the use of input 2, output 4, and timer 5 the following DLT entries are required.

| | | | | | | | | | | | | | |
|---|---|---|---|---|---|---|---|---|---|---|---|---|---|
| DLT line 1 | 31 | 2 | 56 | 0 | 0 | −126 | XX | 0 | 0 | 3 | 71 | 5 | 12 |
| DLT line 2 | 71 | 5 | 12 | 0 | 0 | 0 | XX | 0 | 0 | 0 | 41 | 4 | 32 |
| DLT line 3 | 71 | 5 | 11 | 0 | 0 | 0 | XX | 0 | 0 | 0 | 41 | 4 | 33 |
| Line 1 | | | | | | | | | | | | | |
| D1 = 31 | | | | | input | | | | | | | | |
| N1 = 2 | | | | | 2 | | | | | | | | |
| C1 = 56 | | | | | alarm | | | | | | | | |
| D2 = 0 | | | | | | | | | | | | | |
| N2 = 0 | | | | | | | | | | | | | |
| C2 = −126 | | | | | second count down timer type | | | | | | | | |
| B = 99 | | | | | XX = continue | | | | | | | | |
| D3 = 0 | | | | | | | | | | | | | |
| N3 = 0 | | | | | | | | | | | | | |
| C3 = 3 | | | | | number of units | | | | | | | | |
| D4 = 71 | | | | | timer | | | | | | | | |
| N4 = 5 | | | | | 5 | | | | | | | | |
| C4 = 12 | | | | | start | | | | | | | | |
| Line 2 | | | | | | | | | | | | | |
| D1 = 71 | | | | | timer | | | | | | | | |
| N1 = 5 | | | | | 5 | | | | | | | | |
| C1 = 12 | | | | | started | | | | | | | | |
| D2 = 0 | | | | | | | | | | | | | |
| N2 = 0 | | | | | | | | | | | | | |
| C2 = 0 | | | | | | | | | | | | | |
| B = 99 | | | | | XX = continue | | | | | | | | |
| D3 = 0 | | | | | | | | | | | | | |
| N3 = 0 | | | | | | | | | | | | | |
| C3 = 0 | | | | | | | | | | | | | |
| D4 = 41 | | | | | output | | | | | | | | |
| N4 = 4 | | | | | 4 | | | | | | | | |
| C4 = 32 | | | | | on | | | | | | | | |
| Line 3 | | | | | | | | | | | | | |
| D1 = 71 | | | | | timer | | | | | | | | |
| N1 = 5 | | | | | 5 | | | | | | | | |
| C1 = 11 | | | | | timed out | | | | | | | | |
| D2 = 0 | | | | | | | | | | | | | |
| N2 = 0 | | | | | | | | | | | | | |
| C2 = 0 | | | | | | | | | | | | | |
| B = 99 | | | | | XX = continue | | | | | | | | |
| D3 = 0 | | | | | | | | | | | | | |
| N3 = 0 | | | | | | | | | | | | | |
| C3 = 0 | | | | | | | | | | | | | |
| D4 = 41 | | | | | output | | | | | | | | |
| N4 = 4 | | | | | 4 | | | | | | | | |
| C4 = 33 | | | | | off | | | | | | | | |

Real Life Example #3

The requirement is that if a 4 state N.O. input switch opens then it triggers an output (to sound alarm). The output resets after 6 minutes or if the input switch closes.
The events are—

| E1 | the switch opens |
|---|---|
| E2 | the switch closes |

The results are—

| R1 | start timer 5 |
|---|---|
| R2 | output on |
| R3 | timeout timer 5 |
| R4 | output off |

Assuming the use of input 2, output 4, and timer 5 the following DLT entries are required.

| DLT line 1 | 31 | 2 | 56 | 0 | 0 | −126 | XX | 0 | 0 | 10 | 71 | 5 | 12 |
|---|---|---|---|---|---|---|---|---|---|---|---|---|---|
| DLT line 2 | 31 | 2 | 57 | 0 | 0 | 0 | XX | 0 | 0 | 0 | 41 | 4 | 33 |
| DLT line 3 | 71 | 5 | 12 | 0 | 0 | 0 | XX | 0 | 0 | 0 | 41 | 4 | 32 |
| DLT line 4 | 71 | 5 | 11 | 0 | 0 | 0 | XX | 0 | 0 | 0 | 41 | 4 | 33 |

Line 1
| D1 = 31 | input |
|---|---|
| N1 = 2 | 2 |
| C1 = 56 | alarm |
| D2 = 0 | |
| N2 = 0 | |
| C2 = −126 | second count down timer type |
| B = 99 | XX = continue |
| D3 = 0 | |
| N3 = 0 | |
| C3 = 3 | number of units |
| D4 = 71 | timer |
| N4 = 5 | 5 |
| C4 = 12 | start |

Line 2
| D1 = 31 | input |
|---|---|
| N1 = 2 | 2 |
| C1 = 57 | clear |
| D2 = 0 | |
| N2 = 0 | |
| C2 = 0 | |
| B = 99 | XX = continue |
| D3 = 0 | |
| N3 = 0 | |
| C3 = 0 | |
| D4 = 41 | output |
| N4 = 4 | 4 |
| C4 = 33 | off |

Line 3
| D1 = 71 | timer |
|---|---|
| N1 = 5 | 5 |
| C1 = 12 | started |
| D2 = 0 | |
| N2 = 0 | |
| C2 = 0 | |
| B = 99 | XX = continue |
| D3 = 0 | |
| N3 = 0 | |
| C3 = 0 | |
| D4 = 41 | output |
| N4 = 4 | 4 |
| C4 = 32 | on |

Line 4
| D1 = 71 | timer |
|---|---|
| N1 = 5 | 5 |
| C1 = 11 | timed out |
| D2 = 0 | |
| N2 = 0 | |
| C2 = 0 | |
| B = 99 | XX = continue |
| D3 = 0 | |
| N3 = 0 | |
| C3 = 0 | |
| D4 = 41 | output |
| N4 = 4 | 4 |
| C4 = 33 | off |

Real Life Example #4

The requirement is that if a 2 state N.C. input switch opens (request to exit), or a valid card read occurs, or a door open FDL is received from the controlling authority, the following events are triggered. Timers are started to bypass the 4 state N.C. door alarm input, blink the reader led, energize an output to unlock the door, and pre alarm the reader beeper prior to shunt timeout. When the door opens, the door lock relocks.
The initiating events are

| E1 | switch 1 opens | REX |
|---|---|---|
| E2 | switch 2 opens | door alarm |
| E3 | switch 2 closes | door alarm |
| E4 | valid read | reader 2 |

The results are

| R1 | start timer 5 | door alarm shunt |
|---|---|---|
| R2 | start timer 8 | door pre alarm |
| R3 | start timer 6 | door lock |
| R4 | start timer 7 | reader green LED |
| R5 | output 3 on | door lock |
| R6 | output 3 off | |
| R7 | output 4 on | pre alarm |
| R8 | output 4 off | |
| R9 | timeout timer 5 | |
| R10 | timeout timer 5 | |
| R11 | timeout timer 6 | |
| R12 | timeout timer 7 | |
| R13 | green LED 2 on | reader LED |
| R14 | green LED 2 off | |

The following DLT entries are required.

| | | | | | | | | | | | | | |
|---|---|---|---|---|---|---|---|---|---|---|---|---|---|
| REX input 1 open | | | | | | | custom 21 | | | | | | |
| 31 | 1 | 60 | 0 | 0 | 0 | XX | 0 | 0 | 0 | 128 | 2 | 1 | |
| valid card read on 2 | | | | | | | custom 21 | | | | | | |
| 21 | 2 | 34 | 0 | 0 | 0 | XX | 0 | 0 | 0 | 128 | 2 | 1 | |
| custom 21 | | | | | | | start timer for door 2 shunt | | | | | | |
| 128 | 2 | 1 | 0 | 0 | −126 | XX | 0 | 0 | 20 | 71 | 5 | 12* | |
| custom 21 | | | | | | | start timer for door 2 unlock | | | | | | |
| 128 | 2 | 1 | 0 | 0 | −126 | XX | 0 | 0 | 10 | 71 | 6 | 12* | |
| custom 21 | | | | | | | start timer for green 2 led | | | | | | |
| 128 | 2 | 1 | 0 | 0 | −126 | XX | 0 | 0 | 2 | 71 | 7 | 12 | |
| door open switch | | | | | | | stop door 2 unlock timer | | | | | | |
| 31 | 2 | 56 | 0 | 0 | 0 | XX | 0 | 0 | 0 | 71 | 6 | 13 | |
| door close switch | | | | | | | stop alarm shunt timer | | | | | | |
| 31 | 2 | 57 | 0 | 0 | 0 | XX | 0 | 0 | 0 | 71 | 5 | 13 | |
| door close switch | | | | | | | stop pre alarm timer | | | | | | |

-continued

| | | | | | | | | | | | | |
|---|---|---|---|---|---|---|---|---|---|---|---|---|
| 31 | 2 | 57 | 0 | 0 | 0 | XX | 0 | 0 | 0 | 71 | 8 | 13* |
| shunt timer started | | | | | | | shunt input 2 | | | | | |
| 71 | 5 | 12 | 0 | 0 | 0 | XX | 0 | 0 | 0 | 31 | 2 | 48 |
| shunt timer timeout | | | | | | | set to report input 2 | | | | | |
| 71 | 5 | 11 | 0 | 0 | 0 | XX | 0 | 0 | 0 | 31 | 2 | 26 |
| shunt timer stopped | | | | | | | set to report input 2 | | | | | |
| 71 | 5 | 13 | 0 | 0 | 0 | XX | 0 | 0 | 0 | 31 | 2 | 48 |
| door unlock timer started | | | | | | | unlock door | | | | | |
| 71 | 6 | 12 | 0 | 0 | 0 | XX | 0 | 0 | 0 | 41 | 3 | 32 |
| door unlock timer started | | | | | | | start door pre alarm timer | | | | | |
| 71 | 6 | 12 | 0 | 0 | −126 | XX | 0 | 0 | 5 | 71 | 8 | 12 |
| door unlock timer timeout | | | | | | | relock door | | | | | |
| 71 | 6 | 12 | 0 | 0 | 0 | XX | 0 | 0 | 0 | 41 | 3 | 33 |
| door timer stopped | | | | | | | relock door | | | | | |
| 71 | 6 | 13 | 0 | 0 | 0 | XX | 0 | 0 | 0 | 41 | 3 | 33 |
| door unlock timer timeout | | | | | | | stop pre alarm timer | | | | | |
| 71 | 6 | 11 | 0 | 0 | 0 | XX | 0 | 0 | 0 | 71 | 8 | 13 |
| door timer stopped | | | | | | | stop pre alarm timer | | | | | |
| 71 | 6 | 13 | 0 | 0 | 0 | XX | 0 | 0 | 0 | 71 | 8 | 13 |
| pre alarm timer started | | | | | | | output sounder on | | | | | |
| 71 | 8 | 12 | 0 | 0 | 0 | XX | 0 | 0 | 0 | 41 | 4 | 32 |
| pre alarm timer timedout | | | | | | | output sounder off | | | | | |
| 71 | 8 | 11 | 0 | 0 | 0 | XX | 0 | 0 | 0 | 41 | 4 | 33 |
| pre alarm timer stopped | | | | | | | output sounder off | | | | | |
| 71 | 8 | 13 | 0 | 0 | 0 | XX | 0 | 0 | 0 | 41 | 4 | 33 |
| green led timer started | | | | | | | green led on | | | | | |
| 71 | 7 | 12 | 0 | 0 | 0 | XX | 0 | 0 | 0 | 24 | 2 | 32 |
| green led timer timeout | | | | | | | green led off | | | | | |
| 71 | 7 | 11 | 0 | 0 | 0 | XX | 0 | 0 | 0 | 24 | 2 | 33 |

If the example above were to use card add_time, each of the DLT entries identified with an * would have a 73 in place of the 71 in column D4. The 71 is a TIMER, 72 is DOORTIMER1 and 73 is DOORTIMER2. Since this example is for door 2, Doortimer2 (73) would be chosen for each timer who's length was to be extended.

Appendix A
various Devices that can be used in the FDL.

| DEVICE | VALUE |
|---|---|
| READER | 21 (15H) |
| KEYPAD | 22 (16H) |
| RED_LED | 23 (17H) |
| GREEN_LED | 24 (18H) |
| BEEPER | 25 (19H) |
| INPUT | 31 (1FH) |
| OUTPUT | 41 (29H) |
| MODEM | 51 |
| COUNTER | 61 (3DH) |
| TIMER | 71 (47H) |
| DOORTIMER1 | 72 (48H) |
| DOORTIMER2 | 73 (49H) |
| ASCIIN1 | 81 (51H) |
| ASCIIN2 | 82 (52H) |
| ASCIIOUT1 | 91 (5BH) |
| ASCIIN2 | 92 (5CH) |
| CARD_CODE1 | 100 (64H) STATUS BIT TRUE OR FALSE |
| CARD_CODE2 | 101 (65H) |
| CARD_STAT1 | 102 (66H) STATUS BYTE |
| CARD_STAT2 | 103 (67H) |
| CARD_TIME1 | 104 (68H) ADD TIME VALUE |
| CARD_TIME2 | 105 (69H) |
| CARD_ADD1 | 106 (6AH) ADD TIME TRUE OR FALSE |
| CARD_ADD2 | 107 (6BH) |
| CARD_USR_GRP1 | 108 (6CH) USER GROUP |
| CARD_USR_GRP2 | 109 (6DH) |
| CARD_CMD_GRP1 | 110 (6EH) COMMAND GROUP |
| CARD_CMD_GRP2 | 111 (6FH) |
| KEYPAD_COMMAND | 127 (7FH) |
| CUSTOM | 128 (80H) Pseudo Device |
| DOOR_CTRL | 129 (81H) Pseudo Device |
| OUTPUT_CTRL | 130 (82H) Pseudo Device |
| DIAL_NOW | 131 (83H) Pseudo Device |

| DEVICE | VALUE |
|---|---|
| TCUPD | 200 (C8H) force tcupd |
| V_TC | 201 (C9H) valid time code |
| STARTUP | 202 (CAH) STARTUP FDL CALL |
| PSEUDO_ALARM | 203 {CBH) SEND UNIQUE ID AND STATE |
| TEST_CODE | 254 (FEH) Used in DLT |
| NO_DEVICE | 255 (FFH) Used in DLT |

Appendix B
Various definitions of Action codes can be used in the FDL.

| ACTION or CONDITION | VALUE |
|---|---|
| SET | 01 (01H) |
| RESET | 02 (02H) |
| ANY | 03 (03H) |
| INCREMENT | 04 (04H) |
| DECREMENT | 05 (05H) |
| CHANGE0 | 06 (06H) |
| CHANGE1 | 07 (07H) |
| ENABLE | 08 (08H) |
| DISABLE | 09 (09H) |
| BUSY | 10 (0AH) |
| TIMEOUT | 11 (0BH) |
| START | 12 (0CH) |
| STOP | 13 (0DH) |
| PAUSE | 14 (0EH) |
| CONTINUE | 15 (0FH) |
| DELAY | 16 (10H) |
| UNKNOWN | 17 (11H) |
| EMPTY | 18 (12H) |
| FULL | 19 (13H) |
| PARTIAL | 20 (14H) |
| COMPLETE | 21 (15H) |
| COUNT | 22 (16H) |
| THRESHOLD | 23 (17H) |
| AVAILABLE | 24 (18H) |
| UNAVAILABLE | 25 (19H) |
| REPORT | 26 (1AH) |
| IGNORE | 27 (1BH) |
| DEFINED | 28 (1CH) |
| UNDEFINED | 29 (1DH) |
| OPEN | 30 (1EH) |
| CLOSED | 31 (1FH) |
| ON | 32 (20H) |
| OFF | 33 (21H) |
| V_READ | 34 (22H) |
| I_READ | 35 (23H) |
| C_READ | 36 (24H) |
| ACTIVE | 37 (25H) |
| INACTIVE | 38 (26H) |
| GROUP | 39 (27H) |
| U_GROUP | 40 (28H) |
| C_GROUP | 41 (29H) |
| MODE | 42 (2AH) |
| APB_SET | 43 (2BH) |
| INC_BY | 44 (2CH) |
| DEC_BY | 45 (2DH) |
| RLOCK | 46 (2EH) |
| RUNLOCK | 47 (2FH) |
| SHUNT | 48 (30H) |
| TURNED_ON | 49 (31H) |
| TURNED_OFF | 50 (32H) |
| TRUNLOCK | 51 (33H) TIMED UNLOCK INPUT DATA DEF'S |
| ALARM | 56 (38H) |
| CLEAR | 57 (39H) |
| TROUBLE | 58 (3AH) |
| TAMPER | 59 (3BH) |
| SW_OPEN | 60 (3CH) |
| SW_CLOSED | 61 (3DH) |
| OPEN_CKT | 62 (3EH) |

-continued

| ACTION or CONDITION | VALUE |
|---|---|
| SHORT_CKT | 63 (3FH) |
| HELD | 64 (40H) alarm shunt TIMEOUT (NOT YET!!!) |

Other terms for alarms applied to different installations

| nominal name | 4/NC | 3/NC | 2/NC | 4/NO | 3/NO | 2/NO |
|---|---|---|---|---|---|---|
| SHORT_CKT | TAMPER | TAMPER | CLEAR | TAMPER | ALARM | ALARM |
| SW_CLOSED | CLEAR | CLEAR | ALARM | ALARM | ALARM | ALARM |
| SW_OPEN | ALARM | ALARM | ALARM | CLEAR | CLEAR | CLEAR |
| OPEN_CKT | TROUBLE | ALARM | ALARM | TROUBLE | TROUBLE | CLEAR |

| | Pseudo Codes |
|---|---|
| P_READER_ENABLE | 91 (5BH) |
| P_READER_DISABLE | 92 (5CH) |
| P_INPUT_ENABLE | 93 (5CH) |
| P_INPUT_DISABLE | 94 (5DH) |
| P_OUTPUT_ENABLE | 95 (5EH) |
| P_DISABLE_DISABLE | 96 (5FH) |
| P_RDR_UNLOCK | 101 (65H) |
| P_RDR-RELOCK | 102 (66H) |
| P_OUTPUT_ACTIVE | 103 (67H) |
| P_OUTPUT_INACTIVE | 104 (68H) |
| P_INPUT_ALARM | 105 (69H) |
| P_INPUT_CLEAR | 106 (6AH) |
| P_INPUT_SHORT | 107 (6BH) |
| P_INPUT_OPEN | 108 (6CH) |
| PREALARM | 121 (79H) |
| UP_T_SUBSEC | 125 (7DH) Timer increments by SubSecond ticks |
| UP_SECOND | 126 (7EH) Timer increments by Seconds |
| UP_T_MINUTE | 127 (7FH) Timer increments by Minutes |
| DN_T_MINUTE | 129 (81H) -UP_T_MINUTE Timer decrements by Minutes |
| DN_T_SECOND | 130 (82H) -UP_T_SECOND Timer decrements by Seconds |
| DN_T_SUBSEC | 131 (83H) -UP_T_SUBSEC Timer decrements by SubSecond ticks |

Appendix C
Various BOOLEAN comparisons that can be performed.

| BOOLEAN | | VALUE |
|---|---|---|
| Logical | | |
| FALSE | 0 | FALSE |
| TRUE | 1 | TRUE |
| AND | 2 | A = TRUE AND B = TRUE |
| NAND | 3 | A = FALSE AND B = FALSE |
| OR | 4 | A = TRUE OR B = TRUE OR BOTH |
| NOR | 5 | A = FALSE OR B = FALSE OR BOTH |
| XOR | 6 | NOT USED |
| Numeric | | |
| EQ | 7 | A NOT EQUAL TO B |
| NE | 8 | A = B |
| GT | 9 | A > B |
| GE | 10 | A >= B |

-continued

| BOOLEAN | | VALUE |
|---|---|---|
| LT | 11 | A < B |
| LE | 12 | A <= B |
| XX | 99 | This value is used if no comparisons are to be made. It can be used when data is required for an action |
| ADD | 100 | If an input in condition 3 is to be used, this will add the value of condition 2 to it |
| SUB | 101 | If an input in condition 3 is to be used, this will subtract the value of condition 2 from it. |
| USE | 102 | If an input in condition 2 or 3 is to be used, this will substitute the value of device condition 2 or 3 for the number. |

Although various embodiments which incorporate the teachings of the present invention have been shown and described in detail herein, those skilled in the art can readily devise many other varied embodiments that still incorporate these teachings.

What is claimed is:

1. A method for changing a function of a field controller, said method comprising the steps of:

a) storing a dynamic link table having a plurality of parameters with the field controller, wherein said plurality of parameters comprise an event component and an action component; and b) updating said plurality of parameters of said dynamic link table to change the function of the field controller.

2. The method of claim 1, wherein said updating step comprises the step of forwarding a new set of parameters to said field controller remotely.

3. The method of claim 1, wherein said event component identifies a state change of a device and said action component identifies an action to be taken pertaining to said state change of said device.

4. The method of claim 3, wherein said plurality of parameters further comprise at least one condition component, wherein said at least one condition component identifies a condition that is to be met first before executing said action.

5. The method of claim 4, wherein said at least one condition component comprises a first condition and a second condition.

6. The method of claim 1, wherein said event component identifies a message from a controlling authority and said action component identifies an action to be taken pertaining to said message.

7. The method of claim 6, wherein said plurality of parameters further comprise at least one condition component, wherein said at least one condition component identifies a condition that is to be met first before executing said action.

8. The method of claim 7, wherein said at least one condition component comprises a first condition and a second condition.

9. A computer-readable medium having stored thereon a plurality of instructions, the plurality of instructions including instructions which, when executed by a processor, cause the processor to perform the steps comprising of:

a) storing a dynamic link table having a plurality of parameters with the field controller, wherein said plurality of parameters comprise an event component and an action component; and b) updating said plurality of parameters of said dynamic link table to change the function of the field controller.

10. The computer-readable medium of claim 9, wherein said updating step comprises the step of forwarding a new set of parameters to said field controller remotely.

11. The computer-readable medium of claim 9, wherein said event component identifies a state change of a device and said action component identifies an action to be taken pertaining to said state change of said device.

12. The computer-readable medium of claim 11, wherein said plurality of parameters further comprise at least one condition component, wherein said at least one condition component identifies a condition that is to be met first before executing said action.

13. The computer-readable medium of claim 12, wherein said at least one condition component comprises a first condition and a second condition.

14. The computer-readable medium of claim 9, wherein said event component identifies a message from a controlling authority and said action component identifies an action to be taken pertaining to said message.

15. The computer-readable medium of claim 14, wherein said plurality of parameters further comprise at least one condition component, wherein said at least one condition component identifies a condition that is to be met first before executing said motion.

16. The computer-readable medium of claim 15, wherein said at least one condition component comprises a first condition and a second condition.

17. A programmable system, comprising:

a field controller having a dynamic link table with a plurality of parameters associated with a function, wherein said plurality of parameters comprise an event component and an action component; and a system controller for forwarding a set of parameters to said dynamic link table to change said function.

* * * * *